United States Patent
Kecicioglu et al.

(10) Patent No.: US 11,683,112 B1
(45) Date of Patent: Jun. 20, 2023

(54) SYSTEMS AND METHODS FOR DETECTION OF LTE INGRESS USING LTE SIGNAL PROPERTIES

(71) Applicant: CABLE TELEVISION LABORATORIES, INC, Louisville, CO (US)

(72) Inventors: Balkan Kecicioglu, Erie, CO (US); Vaibhav Singh, New Dehli (IN)

(73) Assignee: Cable Television Laboratories, Inc., Louisville, CO (US)

( * ) Notice: Subject to any disclaimer, the term of this patent is extended or adjusted under 35 U.S.C. 154(b) by 158 days.

(21) Appl. No.: 17/085,614

(22) Filed: Oct. 30, 2020

Related U.S. Application Data

(63) Continuation of application No. 16/039,192, filed on Jul. 18, 2018, now Pat. No. 10,833,787.

(60) Provisional application No. 62/533,862, filed on Jul. 18, 2017.

(51) Int. Cl.
| | |
|---|---|
| *H04J 11/00* | (2006.01) |
| *H04L 5/00* | (2006.01) |
| *H04W 56/00* | (2009.01) |
| *H04W 48/16* | (2009.01) |
| *H04W 16/14* | (2009.01) |
| *H04W 48/12* | (2009.01) |

(52) U.S. Cl.
CPC .......... *H04J 11/0069* (2013.01); *H04L 5/005* (2013.01); *H04L 5/0048* (2013.01); *H04L 5/0062* (2013.01); *H04W 48/16* (2013.01); *H04W 56/0015* (2013.01); *H04J 11/0023* (2013.01); *H04J 11/0073* (2013.01); *H04J 11/0076* (2013.01); *H04W 16/14* (2013.01); *H04W 48/12* (2013.01)

(58) Field of Classification Search
CPC ............... H04J 11/0023; H04J 11/0069; H04J 11/0073; H04J 11/0076; H04L 5/0048; H04L 5/005; H04L 5/0062; H04W 16/14; H04W 48/12; H04W 48/16; H04W 56/0015; G16C 20/30; G16C 20/70; G16C 20/90

See application file for complete search history.

(56) References Cited

U.S. PATENT DOCUMENTS

| | | | |
|---|---|---|---|
| 7,280,564 B1* | 10/2007 | Geile | ............... H04K 1/00 370/507 |
| RE42,236 E * | 3/2011 | Geile | ............. H03M 13/356 370/480 |
| 2012/0243575 A1* | 9/2012 | Fujiki | ................. H04B 1/715 375/E1.033 |
| 2013/0128753 A1* | 5/2013 | Gallagher | ......... H04W 28/0252 370/252 |

(Continued)

*Primary Examiner* — Phuc H Tran
(74) *Attorney, Agent, or Firm* — Josh Snider

(57) ABSTRACT

A communication device in a communication network includes at least one processor. The at least one processor is configured to at least one processor configured to search a spectrum of the communication network using a Long Term Evolution Primary Synchronization/Secondary Synchronization Signals (LTE PSS/SSS), estimate the LTE interference using cell specific reference signals for Down Link (DL) when the LTE PSS/SSS signal is detected, and utilize LTE cell specific reference signals (CRS) and feed the equalized signal to a Data Over Cable Service Interface Specification (DOCSIS) Physical Layer (PHY) engine.

17 Claims, 8 Drawing Sheets

(56) References Cited

U.S. PATENT DOCUMENTS

2015/0029869 A1\* 1/2015 Wolcott ................ H04L 43/50
 370/242
2016/0183268 A1\* 6/2016 Albano ................ H04L 65/612
 370/252

\* cited by examiner

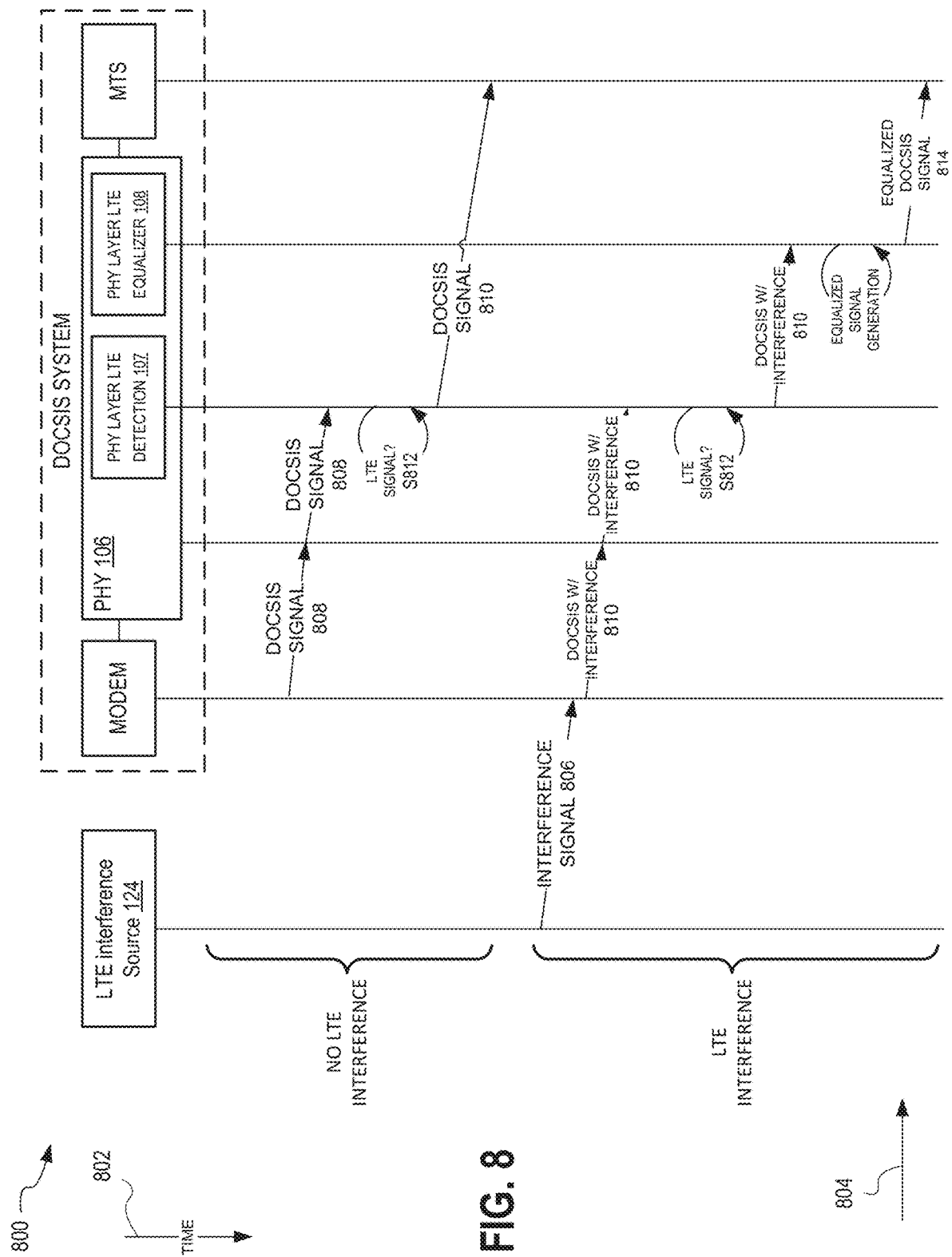

SYSTEMS AND METHODS FOR DETECTION OF LTE INGRESS USING LTE SIGNAL PROPERTIES

CROSS REFERENCE TO RELATED APPLICATIONS

This application is a continuation of U.S. application Ser. No. 16/039,192, filed Jul. 18, 2018, which prior application claims the benefit of and priority to U.S. Provisional Patent Application Ser. No. 62/533,862, filed Jul. 18, 2017, both of which are incorporated herein by reference in their entireties.

BACKGROUND

The field of the disclosure relates generally to coexisting communication platforms, and more particularly, to management of communication systems through detection and remediation of an ingress of one platform onto another platform causing an interference.

Long Term Evolution (LTE) transmission in certain bands (for example 600, 700 and 850 MHz bands) can interfere with a DOCSIS signal, degrading the signal quality to the point that a portion of DOCSIS spectrum could be unusable. In a real-world case, a Multiple System Operator (MSO) had to abandon operation of cable channel 116 and 117 due to LTE interference from a mobile operator's LTE Band 13. Therefore, it is important to cable system operations to detect and also mitigate LTE ingress interference. Conventionally, detection of LTE ingress interference is performed passively by monitoring the impact to DOCSIS performance metrics.

Conventional communication systems include wired networks (e.g., cable, fiber optic, hybrid fiber coaxial (HFC), etc.) and wireless technologies (e.g., Wi-Fi, Bluetooth, Zigbee, Long Term Evolution (LTE), etc.). Some HFC networks include Wi-Fi and/or small cell LTE within the communication system of the network. However, transmissions from a mobile macrocell or a macro base station (Macro BS) within the operational vicinity of the HFC network may interfere with the cable television (CATV) signals throughout the network. An illustrative example of such interference is shown below with respect to FIG. 1.

FIG. 1 illustrates a conventional LTE channel plan 10. As illustrated in FIG. 1, LTE channel plan 10 includes an LTE band plan 12, and is superimposed on a CATV sub-band 14. In this example, LTE band plan 12 is shown to include the 700 MHz range, and CATV sub-band 14 is shown to include channel 108 (696-702 MHz) through channel 126 (804-810 MHz). From the example illustrated in FIG. 1, it can be seen how interference occurs when the 700 MHz LTE frequencies ingress the cable plant on CATV channels. Because the 700 MHz modulation is digital, the interference will appear as an increase in the noise floor in the CATV program or data channel. That is, LTE in the 700 MHz range is a major source of interference for the cable signal. This interference may drive error rates beyond a tolerable level, and further cause the collapse of digital programming. In one instance, a multiple-system operator (MSO) was forced to abandon cable channels 116 and 117 due to interference 16 from a wireless LTE mobile network operator (MNO) downlink (DL).

FIG. 2 is a schematic illustration depicting a conventional cable network 20 operating within the vicinity of a macro base station 22. In this example, macro base station 22 represents a transmitting portion of a wireless LTE MNO, and conventional cable network 20 is an HFC network operable to provide video, voice, and data services to subscribers. Network 20 includes a master headend/hub 24, a node 26, and at least one long fiber or cable 28 (e.g., up to 80 km) connecting headend/hub 24 with node 26. In some examples, headend/hub 24 includes a plurality of headends and/or hubs connected over an optical link (not shown). In this example, headend/hub 24 is in operable communication with at least one satellite earth station/dish 30, the Internet 32, and the public switched telephone network (PSTN) 34. Node 26 connects with a plurality of trunk cables 36 (three shown in this example) that each service a respective service area 38. Each service area 38 may service between 125 and 500 end users 40 (e.g., homes/residences or businesses) that each include at least one cable modem (CM) (not separately shown) connected to a respective trunk cable 36 by one or more drop cables 42.

In operation of network 20, macro base station 22 transmits an LTE signal 44 within the vicinity of a portion 46 of trunk cable 36(1), and thereby introduces interference into the cable signal carried along trunk cable 36(1) that affects all CMs 40 from the point of interference or leakage (i.e., portion 46) onwards (e.g., service area 38(1)). This LTE interference poses an additional problem with respect to inclusion of a small cell base station 48 within the service area 38(1) as another type of end user. Small cell base station 48 is considered "small" with respect to macro base station 22 because small cell base station 48 generally includes a low-powered cellular radio access node having a range of 10 meters to a few kilometers, which is a considerably shorter range than that of macro base station 22, and will also typically handle fewer concurrent calls or sessions. Conventional techniques render it difficult to determine whether placement of small cell base station 48 at the desired location is operationally safe. Furthermore, conventional techniques do not easily detect if LTE interference is present in the given cable plant, nor do they enable the station operator to estimate a safe distance of small cell base station 48 from ingress-affected CMs 40.

BRIEF SUMMARY

In an embodiment, a communication device in a communication network includes at least one processor configured to search a spectrum of the communication network using a Long Term Evolution Primary Synchronization/Secondary Synchronization Signals (LTE PSS/SSS), estimate the LTE interference using cell specific reference signals for Down Link (DL) when the LTE PSS/SSS signal is detected, and utilize LTE cell specific reference signals (CRS) and feed the equalized signal to a Data Over Cable Service Interface Specification (DOCSIS) Physical Layer (PHY) engine.

In an embodiment, a method for detecting an interfering wireless signal ingress on a cable plant of a communication network including at least one measurement device includes the steps of tracking LTE interference on the communication network using an adaptive filter, estimating LTE interference using cell specific reference signals for Down Link when the LTE interference is detected, and rejecting the LTE interference with the adaptive filter using the estimated LTE interference.

In an embodiment, a method for detecting an interfering wireless signal ingress on a cable plant of a communication network including at least one measurement device includes the steps of searching a spectrum of the communication network using a Long Term Evolution Primary Synchronization/Secondary Synchronization Signals (LTE PSS/SSS), estimating the LTE interference using cell specific reference signals for Down Link (DL) when the LTE PSS/SSS signal is detected, and utilizing LTE cell specific reference signals (CRS) and feed the equalized signal to a Data Over Cable Service Interface Specification (DOCSIS) Physical Layer (PHY) engine.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 8 illustrates a signal trace diagram for tracking a detection and mitigation of an LTE ingress onto a DOCSIS based network.

Figure 1:
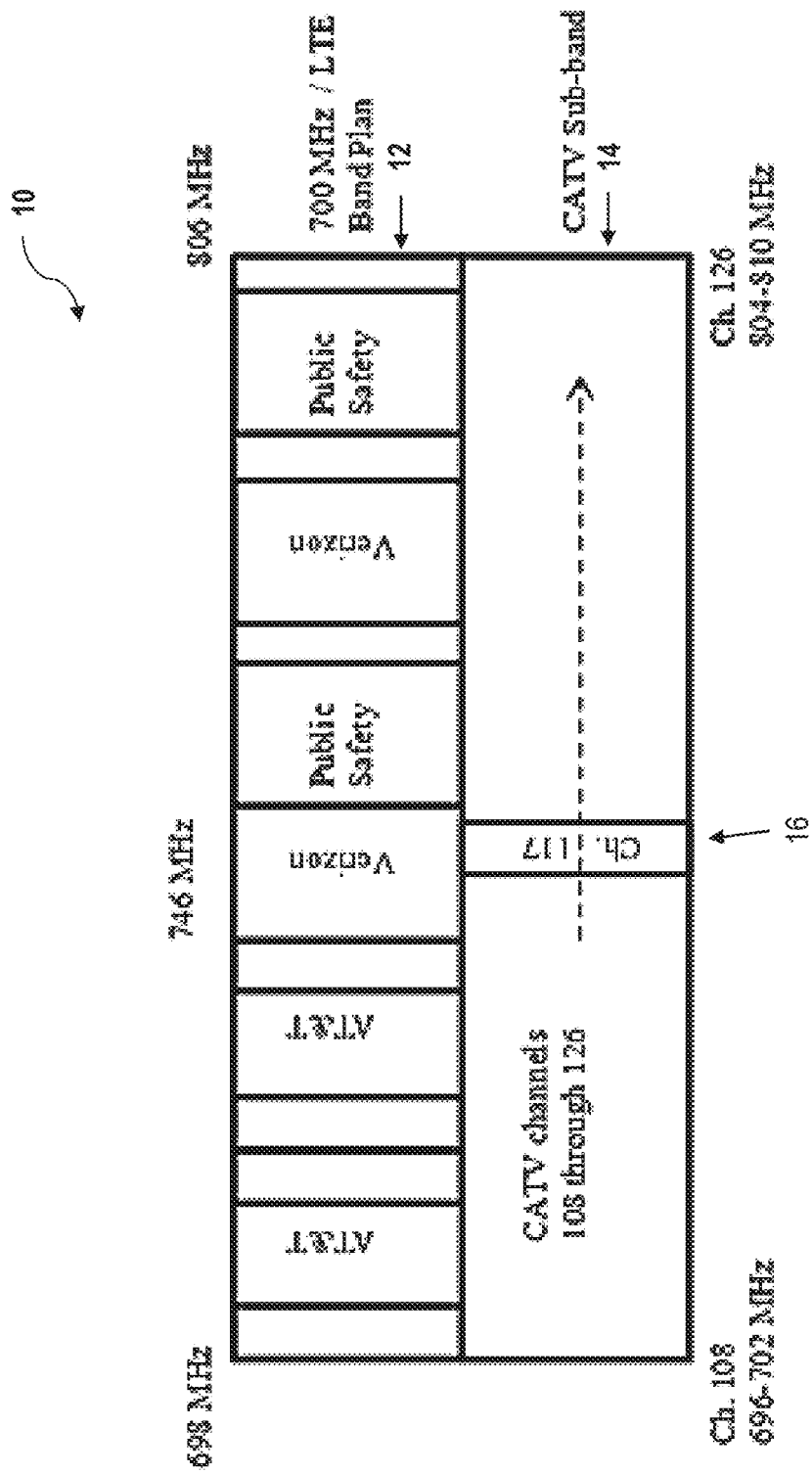
FIG. 1 illustrates a conventional LTE channel plan.
Figure 2:
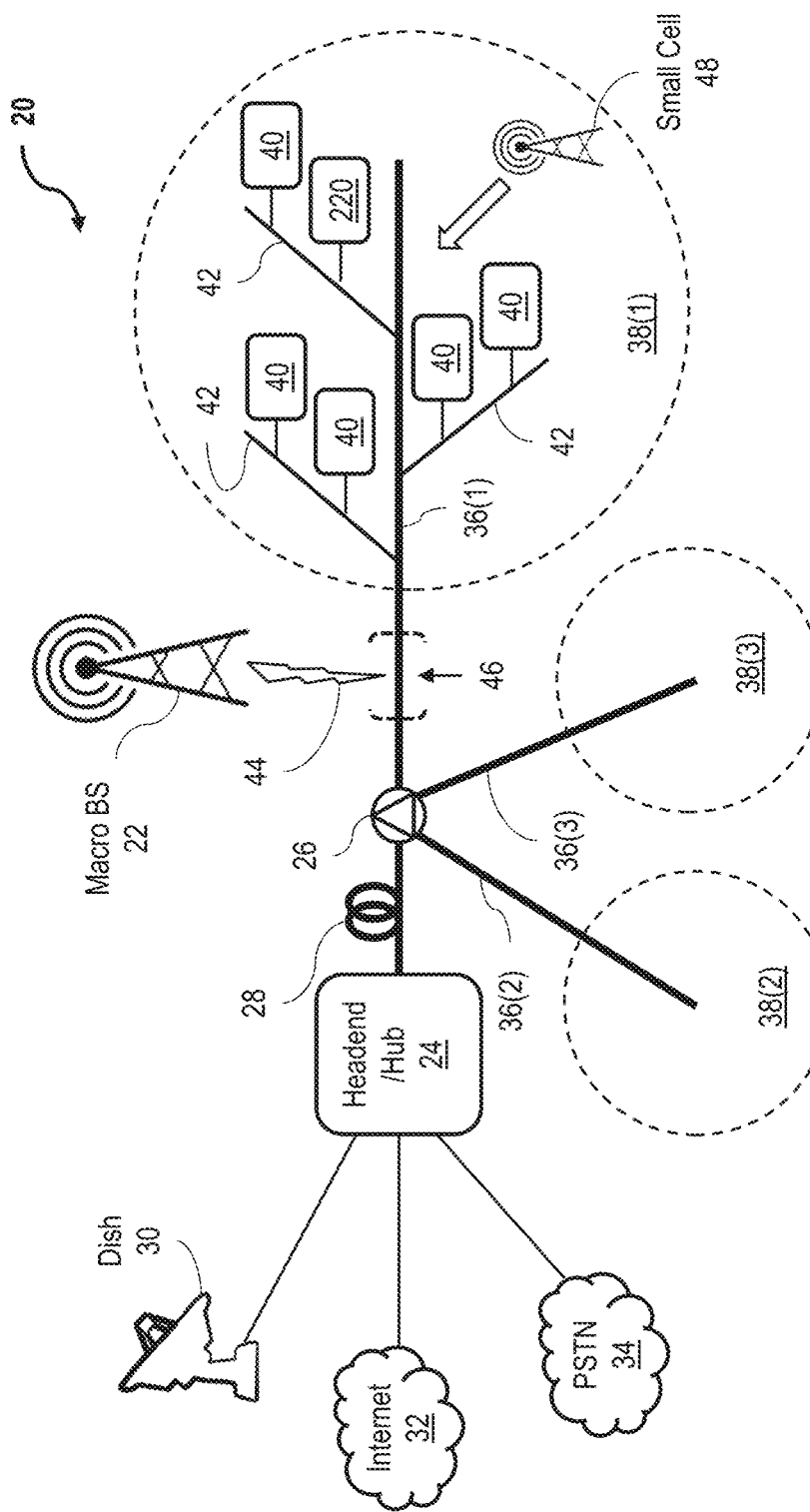
FIG. 2 is a schematic illustration depicting a conventional cable network operating within the vicinity of a macro base station.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As described herein, the phrase "user equipment" includes an electronic device or system utilizing an aggressive, non-cooperative technology protocol, such as LTE-U. The phrase "Wi-Fi device" includes an electronic device, such as a station or STA, that has the capability to use one of the existing 802.11 protocols. For example, a Wi-Fi device can include, without limitation, one or more of a laptop, a desktop personal computer (PC), personal digital assistant (PDA), AP, and a Wi-Fi phone/smartphone. The Wi-Fi device may be fixed, mobile, or portable, and includes a transceiver or transmitter/receiver combination, an 802.11-conformant media access control (MAC) and PHY layer interface(s) to a wireless medium (WM).

The following description features processes and systems for detecting and characterizing a downlink LTE ingress using a novel LTE detection engine operating in conjunction with DOCSIS PHY layer signal processing. The present embodiments relate to management of cable networks in the presence of interfering wireless ingresses within the coverage area. The techniques described herein may also be advantageously implemented to detect and/or monitor egress of bandwidths in the LTE spectrum. LTE signal ingress can impact multiple 20 MHZ chunks of the DOCSIS spectrum. This is a very large portion of a very valuable BW asset for a cable operator. Therefore, mitigation of LTE signal ingress has the potential for a huge impact to the cable operators. As described in greater detail further below, the present embodiments implement innovative algorithms that perform the LTE interference detection in DOCSIS by actively searching for the LTE signal in a separate detection engine. Once detected, the interference in the buffered signal can be suppressed by making use of LTE cell specific reference signals (CRS) and the equalized signal can be fed to DOCSIS PHY engine. Existing methods rely on the impact of LTE on the DOCSIS KPI metrics to detect existence of LTE interference. In the embodiments described herein, LTE signal properties such as PSS/SSS signal, orthogonal frequency-division multiplexing (OFDM) symbol duration, and CRS signals are used by the interference detection engine to detect and remove LTE interference. LTE is based on, for example, 15 kHz subcarrier spacing with subcarriers first stacked up into sets of twelve to form a physical resource block (PRB). In this example, the symbol duration is simply 1/subcarrier and therefore, $1/15000$=66.66 μs. A cyclic prefix is added and fourteen symbols are stacked up into a 1 ms Transmission Time Interval (TTI).

As described herein, a novel LTE detection engine is added to the DOCSIS PHY layer signal processing. The LTE detection engine continuously searches for an LTE signal in the portion of the spectrum where LTE can potentially transmit by using a LTE PSS/SSS signal. If the LTE PSS/SSS signal is detected, the LTE interference is estimated by making use of cell specific reference signals (LTE frame boundary, a cell ID and a system bandwidth) for downlink (DL). This estimate is then used to design an efficient receiver for the effected portion of the DOCSIS signal. In other embodiments, an adaptive filter is implemented to continuously track and reject LTE interference using the estimated interference.

In the exemplary embodiment, each of the foregoing detection and characterization techniques may be implemented individually, or in combination with one or more of the other techniques described herein. In some embodiments, these several techniques may be implemented simultaneously, in succession, or in reverse order. These advantageous detection and characterization techniques are described further below with respect to the several drawings.

Figure 3:
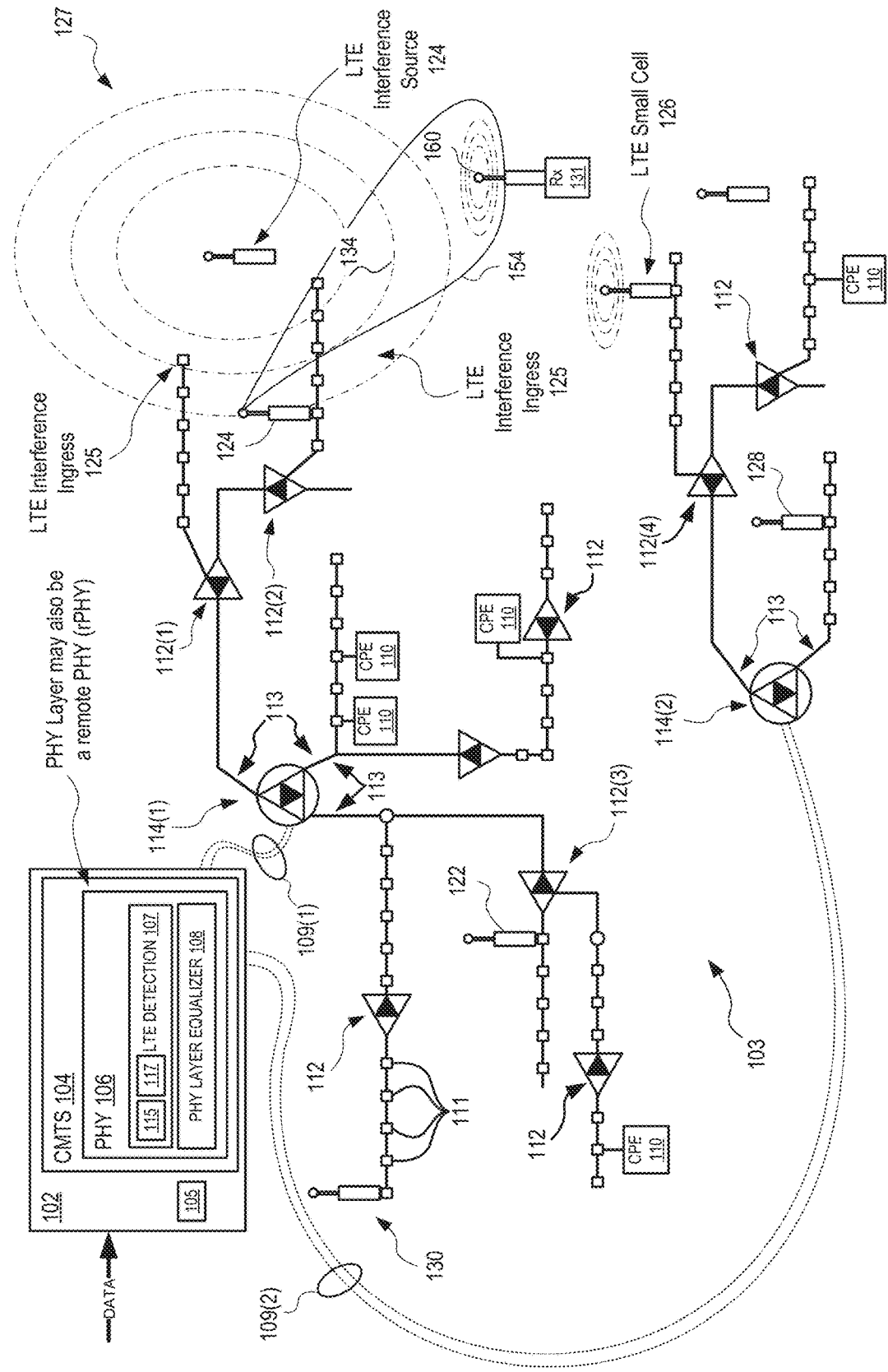
FIG. 3 is a schematic illustration depicting an exemplary wireless regional access network.

FIG. 3 illustrates a network 100 as an exemplary wireless regional access network. Network 100 includes a hub 102 for handling data transmission, a hybrid fiber coax cable (HFCC) network 103 for carrying data between hub 102 and a plurality of end points within HFCC network 103, and multiple remote antenna units 122-130 fed through HFCC network 100 for transmitting to a receiving device/receiver 131.

Hub 102 is shown including a central coordination system (CCS) 105, an RF distribution and combining system (RFDC) 106, an LTE detection engine 107, and an optical transmission and receiving system (OTR) 108. In the exemplary embodiment, HFCC network 103 includes one or more fiber nodes 114, amplifiers 112, taps 111, and transmitters 122-130. Fiber nodes 114 may be operably connected to hub 102 by fiber lines 109 for optically passing data therebetween. Fiber nodes 114 may also be operably connected to taps 111 by, for example, coaxial lines 113, and assisted by amplifiers 112 for the transmission of data across coaxial lines 113. For ease of clarity and illustration some taps 111 are shown with no connections, while others are shown connected to customer premises equipment (CPE) 110 or transmitters 122-130. It will be understood that transmitters 122-130 may be connected with or incorporated into a particular tap 111, may be a standalone device connected with a particular coaxial line 113, or may reside in or be associated with a customer premises, such as via a CPE 110. Receiver 131 is shown at a spot 160 and is represented as a basic antenna type system, but may be a device capable of wirelessly receiving data, and may also be configured to transmit data (e.g., a transceiver). Transmissions from receiver 131 may be in a manner similar to that used to transmit data to receiver 132. Alternatively, receiver 132 may transmit data according to conventionally known principles.

In the exemplary embodiment, hub 102 is configured to perform data apportionment, distribution of the data portions to a plurality of transmitters for transmission to a receiver, and synchronization of data transmissions, such that each data portion arrives at the receiver during its scheduled time period. In the exemplary embodiment illustrated in FIG. 3, central coordination system (CCS) 105 may be configured to manage these hub functions. In exemplary operation, CCS 105 is configured to (i) receive original data and segments/portions the original data, (ii) assign each data portion to a transmission path from hub 102 to receiver 132, (iii) determine delays related to each transmission path, and (iv) coordinate the cooperating transmitters such that data is transmitted from spatially separated transmitters 122-126, but received at receiver 132 as original data. CCS 105 may be further configured with a "universal clock" for synchronizing system 100, and which may be augmented by a delay value determined by hub 102 or CCS 105, which more effectively ensures a timely reception of portioned data at receiver 132.

In the exemplary embodiment, one or more of transmitters 122-130 may utilize one or more of MIMO data transmission, Li-Fi data transmission, laser data transmission, beam forming technology, millimeter Wave data transmission, etc. Accordingly, the present embodiments are particularly advantageous with respect to conventional systems in that the present systems and methods are capable of coordinating data transmission irrespective of the transmission technology of the received data. Additionally, more, fewer, or different transmitters may be utilized without departing from the scope herein.

An LTE interference source 124 operating proximate individual taps 111 may cause an ingress of LTE onto HFCC 103, which, as described above may cause an inference to the DOCSIS spectrum severe enough to render portions of the DOCSIS spectrum unusable. In the exemplary embodiment, a communication device, such as, but not limited to an LTE detection engine 107, is configured to monitor HFCC 103 for LTE and potential LTE interference. In this example, LTE detection engine 107 includes at least one processor 115 configured to search HFCC 103 using a Long Term Evolution Primary Synchronization/Secondary Synchronization Signal (LTE PSS/SSS) monitor. LTE detection engine 107 may therefore be configured to estimate the LTE interference using cell specific reference signals for Down Link (DL) when the LTE PSS/SSS signal is detected, and then LTE detection engine 107 may be further configured to utilize LTE cell specific reference signals (CRS) and feed the equalized signal to a DOC SIS or PHY layer engine for mitigation of the detected LTE interference. LTE detection engine 107 may be further configured to track LTE interference on the HFCC 103 using an adaptive filter 117, estimate LTE interference using cell specific reference signals for DL when the LTE interference is detected, and reject the LTE interference with adaptive filter 117 using the estimated LTE interference.

It will be understood that, according to the present embodiments, functionality for facilitating coordination of data transmission need not reside in a centralized location, such as in hub 102, FIG. 3. The skilled artisan will appreciate that some computational and process aspects of may be located in other components within the system. For example, in the embodiment of FIG. 3, one or more functional aspects of CCS 105 may reside within fiber nodes 114 or amplifiers 112 without depart from the scope herein.

In the exemplary embodiment depicted in FIG. 3, system 100 further includes intelligence capability located within hub 102. It should be understood that some or all of the functionality described above may be pushed out closer to taps 111, for example, such as in fiber nodes 114, amplifiers 112, taps 111, and even CPE 110 or transmitters 122-130.

Figure 4:
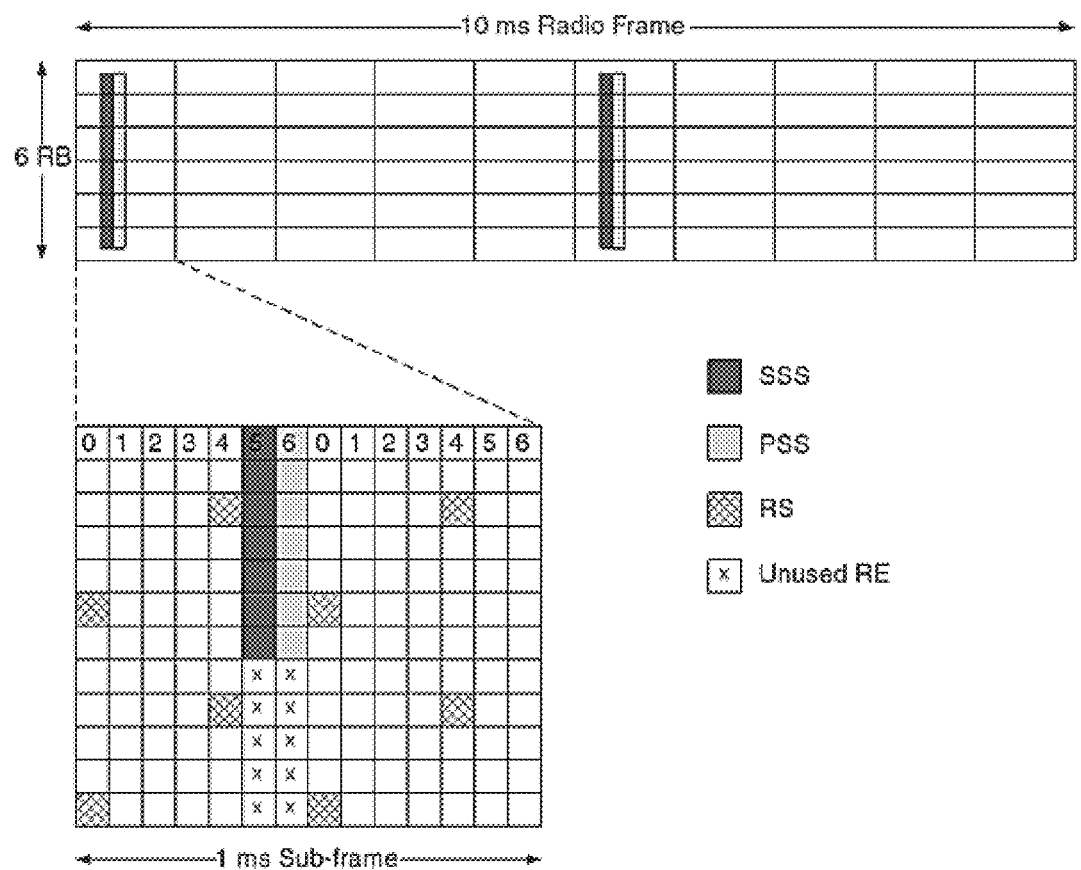
FIG. 4 depicts a frequency domain map of the PSS and SSS subcarriers.

FIG. 4 illustrates a frequency domain map of the PSS and SSS subcarriers. As shown in FIG. 4, the PSS and SSS are transmitted in the central six Resource Blocks (RBs), which correspond to 72 subcarriers, and enable frequency mapping of the synchronization signals to be invariant with respect to the system bandwidth (which can in principle vary from 6 to 110 RBs to suit channel bandwidths between around 1.4 MHz and 20 MHz), thereby allowing the user equipment (UE) to synchronize to the network without any prior knowledge of the allocated bandwidth. In this example, PSS and SSS each include a sequence of length 62 symbols, mapped to the central 62 subcarriers around the d.c. subcarrier, which is left unused. Accordingly, the five resource elements at the end of each synchronization sequence are not used. This structure enables the UE to detect the PSS and SSS using a size-64 Fast Fourier Transform (FFT) and a lower sampling rate than would have been necessary if all 72 subcarriers were used in the central six resource blocks. The shorter length for the synchronization sequences also avoids the possibility in a Time Division Duplex (TDD) system of a high correlation with the uplink demodulation reference signals which use the same kind of sequence as the PSS.

Figure 5:
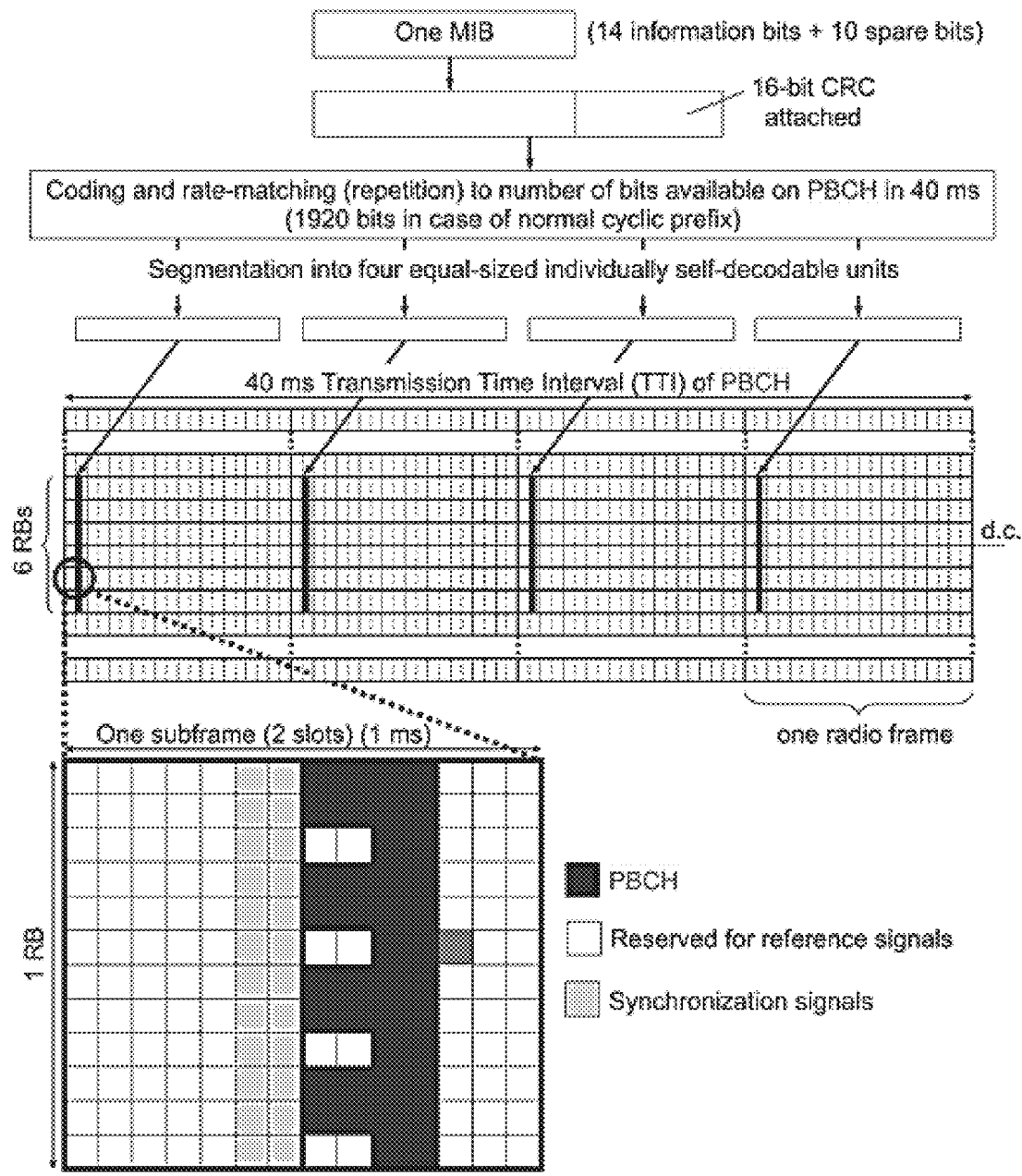
FIG. 5 illustrates a basic System Information (SI) in cellular systems

FIG. 5 illustrates a basic System Information (SI) in cellular systems which allows the other channels in the cell to be configured, and in which operations may be carried by a Broadcast CHannel (BCH). Therefore, the achievable coverage for reception of the BCH is important to the successful operation of such cellular communication systems including LTE. The broadcast SI is divided into two categories: (1) the 'Master Information Block' (MIB), which includes a limited number of the most frequently transmitted parameters essential for initial access to the cell, and is carried on the Physical Broadcast CHannel (PBCH); and (2) the other System Information Blocks (SIBs) which, at the PHY layer, are multiplexed with unicast data transmitted on the Physical Downlink Shared CHannel (PDSCH)

PBCH design includes some specific requirements, detectability without prior knowledge of the system bandwidth, low system overhead, reliable reception right to the edge of the LTE cells, and decodability with low latency and low impact on UE battery life.

Detectability without the UE having prior knowledge of the system bandwidth may be achieved by mapping the PBCH to the central 72 subcarriers of the OFDM signal (which corresponds to the minimum possible LTE system bandwidth of 6 Resource Blocks (RBs)), regardless of the actual system bandwidth. The UE will have first identified the system center frequency from the synchronization signals.

Low system overhead for the PBCH may be achieved by keeping the amount of information carried on the PBCH to a minimum, since achieving stringent coverage requirements for a large quantity of data would result in a high system overhead. In the exemplary embodiment, the size of the MIB is thus 14 bits, and, since repeated every 40 ms, this size advantageously corresponds to a data rate on the PBCH of 350 bps.

In an exemplary embodiment, time diversity may be exploited by spreading out the transmission of each MIB on the PBCH over a period of 40 ms. This advantageous technique will significantly reduce the likelihood of an entire MIB being lost in a fade in the radio propagation channel, even when the mobile terminal is moving at pedestrian speeds.

In some embodiments, the FEC coding for the PBCH is configured to utilize a convolutional coder, such that the number of information bits to be coded may be kept relatively small. In this example, the basic code rate is ⅓, after which a high degree of repetition of the systematic (i.e. information) bits and parity bits may be used, such that each MIB may be coded at a substantially lower code rate (e.g., ¹⁄₄₈ over a 40 ms period) to provide stronger error protection.

In some embodiments, antenna diversity may be utilized at both the eNodeB and the UE. The UE performance requirements specified for LTE assume that all UEs can achieve a level of decoding performance commensurate with dual-antenna receive diversity (although it is recognized that in low-frequency deployments, such as below 1 GHz, the advantage obtained from receive antenna diversity is reduced due to the correspondingly higher correlation between the antennas); this enables LTE system planners to rely on this level of performance being common to all UEs, thereby enabling wider cell coverage to be achieved with fewer cell sites than would otherwise be possible. Transmit antenna diversity may be also employed at the eNodeB to further improve coverage, depending on the capability of the eNodeB; eNodeBs with two or four transmit antenna ports transmit the PBCH using a Space-Frequency Block Code (SFBC).

In the exemplary embodiment, the precise set of Resource Elements (REs) used by the PBCH may be independent of the number of transmit antenna ports used by the eNodeB. That is, REs which may be used for Reference Signal (RS) transmission may be avoided by the PBCH, irrespective of the actual number of transmit antenna ports deployed at the eNodeB. The number of transmit antenna ports used by the eNodeB may then be ascertained or discovered blindly by the UE, such as by performing the decoding for each SFBC scheme corresponding to the different possible numbers of transmit antenna ports (namely one, two, or four). This discovery of the number of transmit antenna ports may be further facilitated utilizing the Cyclic Redundancy Check (CRC) on each MIB, which is masked with a code word representing the number of transmit antenna ports.

Additionally, achieving low latency and a low impact on UE battery life may be facilitated through the present improved design of the coding, as described above. That is, in the exemplary embodiment, a low code rate with repetition advantageously enables the full set of coded bits to be divided into four subsets, each of which may be individually self-decodable. Each of these subsets of the coded bits may then be transmitted in a different one of the four radio frames during the 40 ms transmission period, as shown in FIG. 5. Accordingly, if the Signal to Interference Ratio (SIR) of the radio channel is sufficient to allow the UE to decode the MIB correctly from the transmission in less than four radio frames, then the UE does not need to receive the other parts of the PBCH transmission in the remainder of the 40 ms period. In contrast, if the SIR is relatively low, the UE can receive additional portions of the MIB transmission, soft-combining each additional portion with those portions that have already been received, and until successful decoding is achieved.

The embodiments described above, the timing of the 40 ms transmission interval for each MIB on the PBCH need not be not explicitly indicated to the UE. Instead, the timing may be implicitly ascertained from the scrambling and bit positions, which are re-initialized every 40 ms. The UE can therefore initially determine the 40 ms timing by performing four separate decodings of the PBCH using each of the four possible phases of the PBCH scrambling code, checking the CRC for each decoding.

When a UE initially attempts to access a cell by reading the PBCH, a variety of approaches may be taken to carry out the necessary blind decodings. A simple approach is always to perform the decoding using a soft combination of the PBCH over four radio frames, advancing a 40 ms sliding window one radio frame at a time until the window aligns with the 40 ms period of the PBCH and the decoding succeeds. However, this would result in a 40-70 ms delay before the PBCH can be decoded. A faster approach would be to attempt to decode the PBCH from the first single radio frame, which should be possible provided the SIR is sufficiently high; if the decoding fails for all four possible scrambling code phases, the PBCH from the first frame could be soft-combined with the PBCH bits received in the next frame—there is a 3-in-4 chance that the two frames contain data from the same transport block. If decoding still fails, a third radio frame could be combined, and failing that a fourth. It is evident that the latter approach may be much faster (potentially taking only 10 ms), but on the other hand requires slightly more complex logic.

Figure 6:
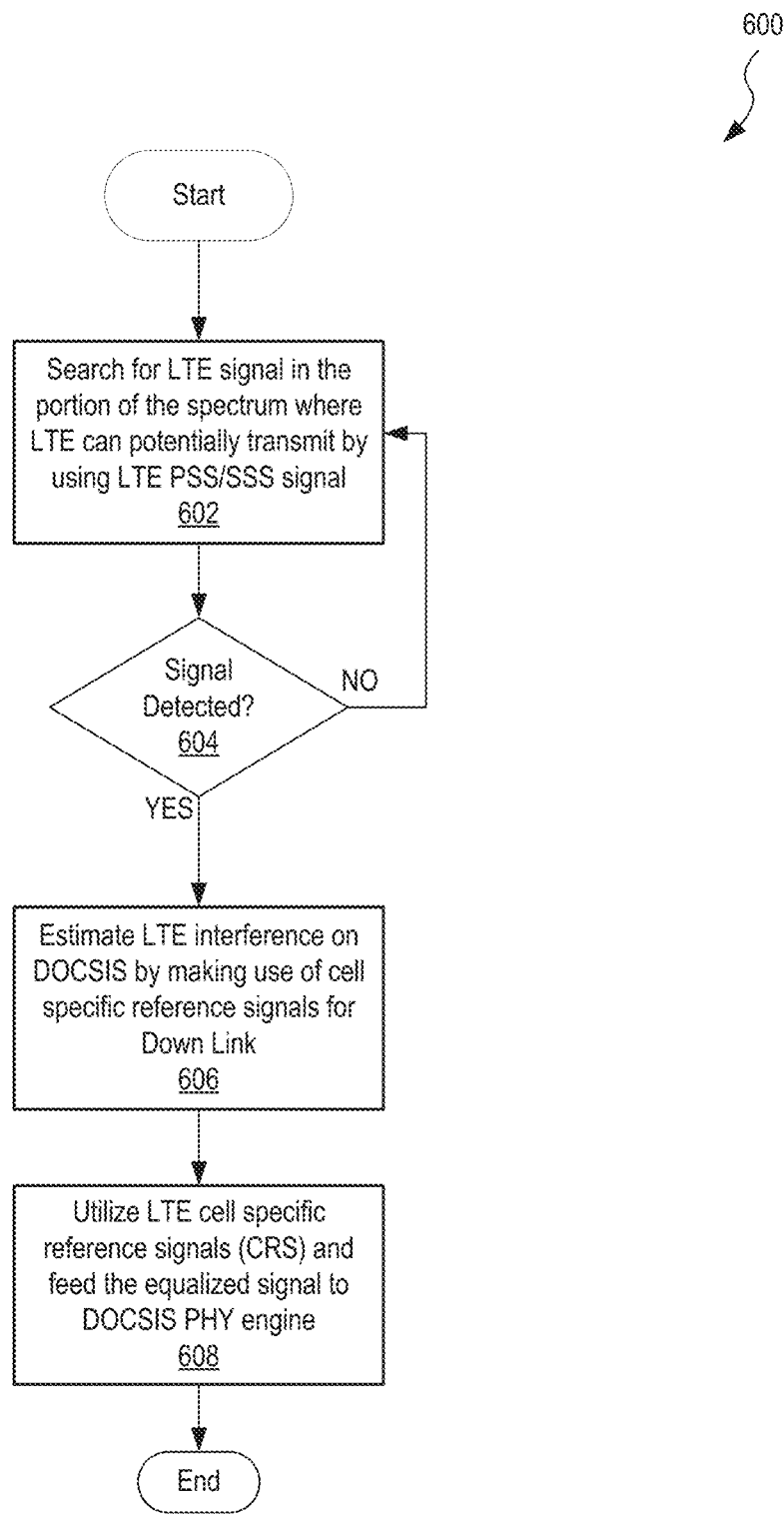
FIG. 6 is a flow chart of a process of detecting and mitigating interference due to an LTE ingress onto the HFCC network depicted in FIG. 3.

FIG. 6 illustrates a flow chart of a process 600 for detecting and mitigating interference due to an LTE ingress onto HFCC network 103 (shown in FIG. 3). In the example embodiment, at step 602, LTE detection engine 107 is configured to search for an LTE signal presence in the portion of the HFCC network DOC SIS spectrum where LTE can potentially transmit. In an exemplary embodiment of step 602, searching is performed continuously. In some embodiments, LTE detection engine 107 performs the search using the LTE PSS/SSS signal. In step 604, if an LTE signal is detected, process 600 proceeds to step 606, where LTE detection engine 107 estimates LTE interference on the DOCSIS spectrum by making use of CRS for DL. If no LTE signal is detected in step 604, process 600 returns to step 602. In some embodiments, the cell specific reference signals include at least one of an LTE frame boundary, a cell ID and a system bandwidth. In step 608, the CRS are utilized to feed the equalized signal to PHY layer equalizer 108 for remediation of the LTE ingress interference.

As described above, after the LTE frame boundary, the cell ID, and the system bandwidth are determined, the CRS values will be known at least on the first three OFDM symbols received. In some embodiments, for the remaining OFDM symbols, the eNB may be configured to apply a UE-specific phase shift to the CRS values. In at least one embodiment, the phase shift may be indicated by a control signal that need not to be decoded on DOCSIS side. The CRS symbols on the first 3 OFDM symbols may be thus utilized to extract the frequency response of the LTE interference, and these values then can be used on the DOC SIS equalization process.

Figure 7:
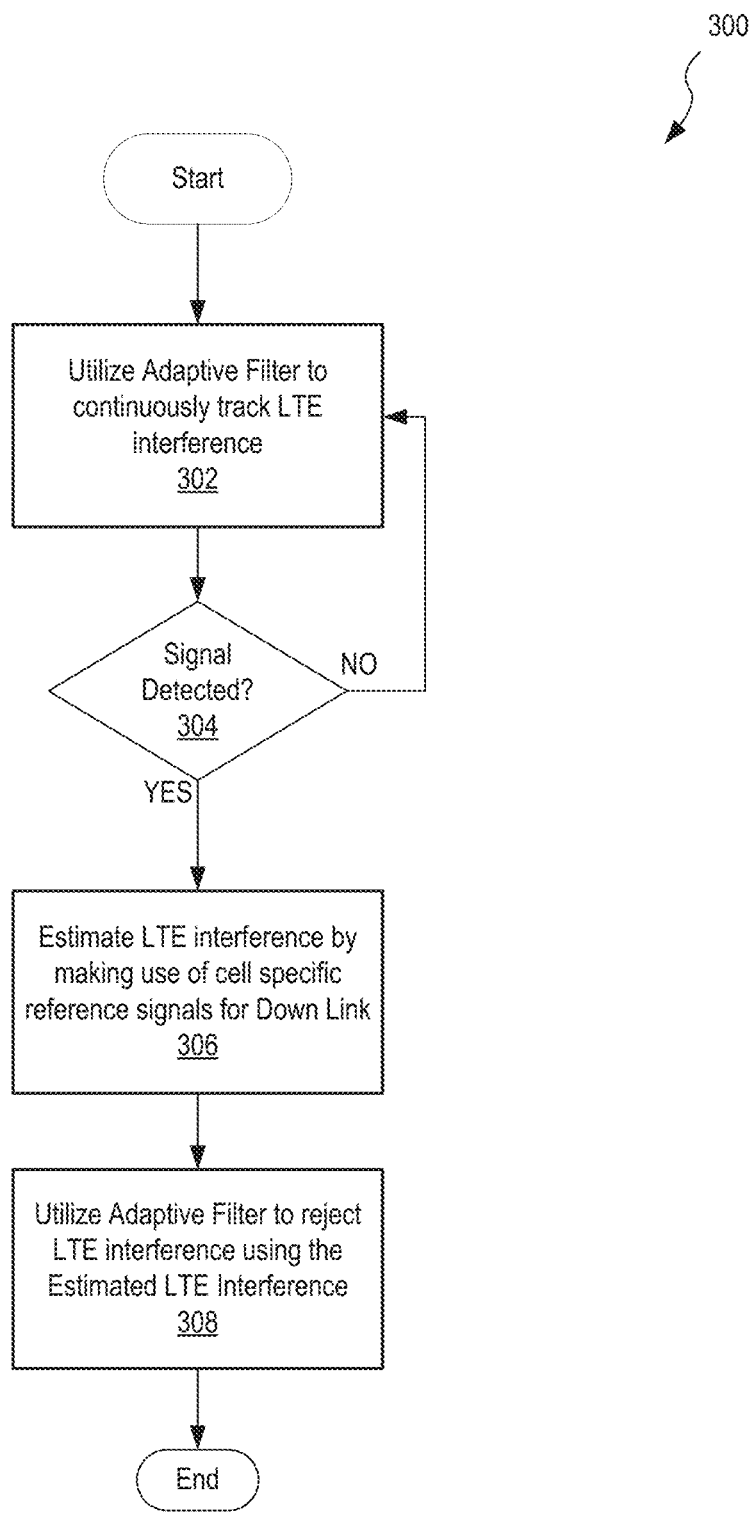
FIG. 7 is a flow chart of an alternative process of detecting and mitigating interference due to an LTE ingress onto the HFCC network depicted in FIG. 3.

FIG. 7 illustrates a flow chart of a process 300 for detecting and mitigating interference due to an LTE ingress onto HFCC network 103 (shown in FIG. 3). In the example embodiment, at step 302, utilizes an adaptive filter to continuously track LTE interference, similar to step 602, FIG. 6, described above. In step 304, if an LTE signal is detected, process 700 proceeds to step 306, where LTE detection engine 107 is configured to estimate LTE interference utilizing CRS for DL. If no LTE signal is detected in step 304, process 700 returns to step 302. In step 308, the adaptive filter is utilized to reject the LTE interference using the estimated interference.

FIG. 8 is a signal trace diagram 800 tracking a detection and mitigation of an LTE ingress onto a DOCSIS based network, HFCC 103. Diagram 800 includes a Y-axis 802 graduated in units of time and an X-axis 804 illustrating passage of the process through implementing components. In exemplary operation, beginning at LTE interference source 124 (shown in FIG. 3), an interference signal 806 is introduced onto HFCC 103. At tap 111, which may be embodied in a modem (e.g., a CM, not separately numbered), interference signal 806 and a DOCSIS signal 808 are combined as a mixed signal 810 and interference signal 806 may interfere with DOCSIS signal 808 at this point. Processing of the mixed signal 810 begins in LTE detection engine 107. If LTE is detected at step 812, LTE detection engine 107 operates to mitigate the LTE interference based on the properties of the LTE signal detected (see FIGS. 6 and 7, and accompanying descriptions, above). In the exemplary embodiment, PHY layer LTE equalizer 108 generates an equalized signal 814, and transmits equalized signal 814 to the MTS. Equalized signal 814 thus advantageously mitigates the LTE interference.

Exemplary embodiments of systems and methods for detecting and mitigating LTE ingress are described above in detail. The systems and methods of this disclosure though, are not limited to only the specific embodiments described herein, but rather, the components and/or steps of their implementation may be utilized independently and separately from other components and/or steps described herein. Additionally, for ease of explanation, the present embodiments are described herein with respect to DOCSIS communications, but the person of ordinary skill in the art will understand how the innovative principles of the present systems and methods are applicable to other types of cable networks and communications, and also to other types of interference other than LTE, such as LAA, New Radio, NR-U, etc.

Although specific features of various embodiments of the disclosure may be shown in some drawings and not in others, this convention is for convenience purposes and ease of description only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor." These relevant computer instructions may thus constitute one or more of the algorithms described above, which may be included, in the exemplary embodiment, at the receiver. A receiver encoded with these algorithms operates more efficiently than the conventional receiver, and may be dynamically adaptive in the presence of LTE interference.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A coordination device for a communication network operating according a first communication protocol, the coordination device comprising:
   a detection engine configured to (i) actively search a spectrum of the communication network for an ingressing signal from a separate wireless downlink interference source using signal properties of a second communication protocol of the ingressing signal, wherein the second protocol is different from the first communication protocol, (ii) detect the ingressing signal, and (iii) estimate an interference level of the detected ingressing signal using reference signals of the wireless downlink interference source; and an equalizer configured to (i) receive a network transmission including the ingressing signal at the interference level and a signal component according to the first communication protocol, (ii) remediate the interference level, using the reference signals, from the signal component, and (iii) transmit an equalized signal that includes the signal component and remediates the ingressing signal.

2. The coordination device of claim 1, wherein the communication network comprises a cable television network.

3. The coordination device of claim 1, wherein the detection engine is further configured to actively search the spectrum of the cable television network in a smaller portion of the spectrum where the wireless downlink interference source is known to potentially transmit.

4. The coordination device of claim 3, wherein the detection engine is further configured to actively search the spectrum in a band between 600 Mhz and 850 Mhz.

5. The coordination device of claim 4, wherein the detection engine is further configured to actively search the spectrum in a band between 700 Mhz and 800 Mhz.

6. The coordination device of claim 5, wherein the detection engine is further configured to actively search the spectrum in a band between 750 Mhz and 790 Mhz.

7. The coordination device of claim 1, wherein the first communication protocol comprises a data over cable service interface specification (DOCSIS) protocol, and wherein the second communication protocol comprises a long term evolution (LTE) protocol.

8. The coordination device of claim 7, wherein the detection engine is further configured to actively search the spectrum for LTE primary synchronization signals/secondary synchronization signals (LTE PSS/SSS).

9. The coordination device of claim 8, wherein the reference signals comprise LTE cell specific reference signals (CRS) including at least one of an LTE frame boundary, a cell ID, and a system bandwidth.

10. The coordination device of claim 9, wherein the detection engine is further configured to determine the CRS from orthogonal frequency division multiplexing (OFDM) symbols detected in the network transmission.

11. The coordination device of claim 10, wherein the detection engine is further configured to extract a frequency response of LTE interference using a first three OFDM symbols having an OFDM symbol duration.

12. The coordination device of claim 11, wherein the equalizer is further configured to remediate the interference level of the detected LTE ingressing signal on the DOCSIS signal component using the extracted frequency response.

13. The coordination device of claim 11, wherein the detection engine includes an adaptive filter configured to continuously track and reject the frequency response of LTE interference based on the estimated interference level.

14. The coordination device of claim 11, wherein the detection engine includes a processor disposed within one of (i) a physical (PHY) layer of a hub of the communication network, and (ii) a remote PHY (rPHY) layer.

15. A method for detecting an ingressing wireless signal on a cable plant configured to transmit a radio frequency (RF) signal according to a first communication protocol over a communication network, the method performed by at least one measurement device configured to receive and distribute the wired RF signal, the method comprising the steps of:

searching an RF spectrum of the communication network (i) for detectable signal properties of the ingressing wireless signal operating at a second communication protocol different from the first communication protocol, and (ii) using signal properties of the second communication protocol of the ingressing wireless signal;

detecting the detectable signal properties in the transmitted RF signal on the cable plant;

estimating an interference level of the ingressing wireless signal on the transmitted RF signal using downlink reference signals according to the second communication protocol; and equalizing the transmitted RF signal to generate an equalized signal remediating the interference level of the ingressing wireless signal on the transmitted RF signal;

distributing the equalized signal to a physical (PHY) layer engine utilizing the first communication protocol.

16. The method of claim 15, wherein the downlink reference signals comprise long term evolution (LTE) cell specific reference signals (CRS), wherein each CRS includes at least one of an LTE frame boundary, a cell ID, and a system bandwidth.

17. The method of claim 15, wherein the measurement device comprises an adaptive filter.

* * * * *